United States Patent [19]

Gardenier et al.

[11] Patent Number: 4,645,537

[45] Date of Patent: Feb. 24, 1987

[54] AQUEOUS RELEASE AGENTS

[75] Inventors: Karl-Josef Gardenier; Wolfgang Heimbürger, both of Duesseldorf, Fed. Rep. of Germany

[73] Assignee: Henkel Kommanditgesellschaft auf Aktien, Duesseldorf, Fed. Rep. of Germany

[21] Appl. No.: 810,802

[22] Filed: Dec. 18, 1985

Related U.S. Application Data

[62] Division of Ser. No. 713,528, Mar. 19, 1985, Pat. No. 4,576,835.

[30] Foreign Application Priority Data

Mar. 24, 1984 [DE] Fed. Rep. of Germany ....... 3410957

[51] Int. Cl.$^4$ .................. A23L 1/00; C08L 91/00; C09D 3/26; C09K 3/00
[52] U.S. Cl. .................. 106/243; 106/287.17; 106/287.24; 106/287.26; 252/383; 252/384
[58] Field of Search .............. 106/243, 287.17, 287.24, 106/287.26; 156/327, 332, 334; 252/383, 384; 427/222

[56] References Cited

U.S. PATENT DOCUMENTS

| | | | |
|---|---|---|---|
| 2,238,149 | 4/1941 | Aeckerle | 252/384 X |
| 2,539,012 | 1/1951 | Diamond et al. | 252/384 X |
| 2,589,330 | 3/1952 | Bradford et al. | 252/384 X |
| 3,272,593 | 9/1966 | Fee | 252/384 X |
| 3,755,450 | 8/1973 | Anderson et al. | 252/383 X |
| 3,801,511 | 4/1974 | Lemoff | 252/135 |
| 3,925,226 | 12/1975 | Takenouchi et al. | 252/384 X |
| 4,196,095 | 4/1980 | Cala et al. | 252/140 |

FOREIGN PATENT DOCUMENTS 2218377  9/1974  France .................. 252/384

*Primary Examiner*—Michael R. Lusignan
*Attorney, Agent, or Firm*—Ernest G. Szoke; Henry E. Millson, Jr.

[57] ABSTRACT

An aqueous release agents for the temporary antiadhesive surface-finishing of tacky pellets, granulates, cubes, flakes and the like, which is a 0.5 to 25% by weight and, more particularly, a 5 to 20% by weight solution of one or more at least dihydric aliphatic alcohol containing from 3 to 7 carbon atoms and/or one or more at least tribasic aliphatic hydroxycarboxylic acid or water-soluble salt thereof, optionally in combination with from 0.2 to 15% by weight of a water-insoluble salt of a $C_{12}$–$C_{36}$ aliphatic or alicyclic mono- or dicarboxylic acid, and the use of these release agents in the production of hotmelt adhesives, more particularly pressure-sensitive hotmelt adhesives.

4 Claims, No Drawings

AQUEOUS RELEASE AGENTS

This application is a division of application Ser. No. 713,528, filed Mar. 19, 1985, now U.S. Pat. No. 4,576,835, patented Mar. 18, 1986.

BACKGROUND OF THE INVENTION

1. Field of the Invention

This invention relates to aqueous mixtures suitable for use as release agents and to their use in the production of hotmelt adhesives, more especially pressure-sensitive hotmelt adhesives.

2. Description of Related Art

Hotmelt adhesives, also known in brief as hotmelts, are used for bonding in various fields. Among hotmelt adhesives, those of the pressure-sensitive, i.e. permanently tacky, type occupy a special position. Due to this special ability to remain tacky, even at room temperature, they give rise to particular problems when it comes to their application.

A special technique has been developed for the production and processing of hotmelt adhesives (cf. "Seifen, Oele, Fette, Wachse" (1976), pages 279 to 282). After the raw materials required for the adhesive have been melted, the adhesive is granulated. For example, a hotmelt may be applied in the form of strips to a cooled steel belt optionally covered by a film of water. After the adhesive has cooled sufficiently, it is size-reduced in a cutter unit. This operation may be carried out in the presence of aqueous release agents, such as solutions of anion-active wetting agents or water-soluble soaps. It may also be necessary to powder the granules with talcum or the like.

Hitherto, it has not been possible to granulate or pelletize the pressure-sensitive permanently tacky hotmelt adhesives which have been successfully used for numerous applications. Although attempts have been made to coat permanently tacky hotmelt adhesives with a layer of a temporarily tacky adhesive and, in this way, to obtain pellet-like forms after size-reduction, elaborate machinery is required for this purpose. In practice, therefore, the permanently tacky hotmelt adhesives are still packed in cartons coated with release agents and left therein until they are actually used, i.e. melted.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide aqueous release agent compositions which enable permanently tacky hotmelt adhesives to be processed into granulates, pellets, cubes or flakes and which, in addition, ensure that the particles do not cake together either during storage or during transport. Another object of the invention is to provide release agents which may be applied to the surfaces in such small quantities that, after melting, no undesirable changes take place in the characteristic properties of the pressure-sensitive adhesives.

According to the invention, these objects are achieved by aqueous release agents for the temporary, anti-adhesive surface finishing of tacky pellets, granulates, cubes, flakes and the like, which aqueous release agents are a 0.5 to 25% by weight, preferably, a 5 to 20% by weight, aqueous solution of at least one at least dihydric aliphatic alcohol containing from 3 to 7 carbon atoms and/or of at least one aliphatic hydroxy dicarboxylic or tricarboxylic acid or water-soluble salt thereof.

Preferred representatives of the at least dihydric alcohols are mannitol and trimethylolalkanes containing from 2 to 4 carbon atoms in the alkane skeleton (trimethylolethane, -propane and -butane) and also tetramethylolmethane (pentaerythritol). Preferred hydroxy di- or tricarboxylic acids are dihydroxy succinic acid (tartaric acid) and dihydroxy citric acid and also water-soluble salts thereof, more particularly the readily water-soluble alkali metal and ammonium salts. Although glycerol or ethylene glycol or propylene glycol may also be used as the at least dihydric alcohol, they generally show an inadequate effect when used alone, i.e., in the absence of other additives of the type mentioned hereinafter.

The effectiveness of the release agents of the invention can be improved by additionally incorporating in them from 0.2 to 15% by weight, preferably from 0.5 to 10% by weight, based on the release agent solution as a whole, of at least one water-insoluble salt of a $C_{12}$–$C_{36}$ saturated aliphatic and/or alicyclic monocarboxylic or dicarboxylic acid having no other functional groups. Such water-insoluble salts are, in particular, those of calcium, barium, zinc or aluminium. In one preferred embodiment, the aqueous release agents according to the invention additionally contain from 0.5 to 10% by weight (based on the solution) of the calcium and/or aluminium salt of a $C_{14}$–$C_{22}$ saturated fatty acid.

The process of the invention is particularly economical because the relatively dilute aqueous solutions or suspensions of the invention are pump-circulated during the process and only small quantities of the active substance are deposited on the granulates or pellets formed. These quantities are of the order of 0.1 to 10%, based on the hotmelt adhesive. In general, only about 0.2 to 0.6% is deposited on the surface of the hotmelt adhesive. The above quantities do of course depend to a certain extent upon the size of the pellets or granulates and also upon the hotmelt adhesives used.

It has surprisingly been found that the difficultly soluble salts of $C_{12}$–$C_{36}$ mono- or dicarboxylic acids additionally used are unable on their own to produce a permanent, antiadhesive coating. Deposits produced with these difficultly soluble salts become inactive after a while at room temperature, with the result that the particles subsequently cake together.

The release agents according to the invention are preferably used in the production of hotmelt adhesives, more especially pressure-sensitive hotmelt adhesives, which are distinguished by high surface tackiness. Pressure-sensitive hotmelt adhesives have been known for some time and are described, for example, in the book by D. L. Baterman entitled "Hot Melt Adhesives", 3rd Edition (1978), pages 301 to 346, and in numerous other publications, more especially in the patent literature. Widely used compositions are based on block polymers in which polystyrene blocks are polymerized onto an elastomeric central block. Polymers such as these are commercially available and are processed together with tackifying resins and other auxiliaries. Elastomeric ethylene-vinyl acetate polymers can also be used as base for permanently tacky hotmelt adhesives.

Even when very different raw materials are used for the adhesive and processed in known machines for the production of hotmelt granulates or pellets, an inert coating is formed on the material obtained by treatment with the aqueous release agents of the invention, which produces hardly any changes in the performance properties of the hotmelt or pressure-sensitive hotmelt.

Since the invention enables pressure-sensitive hotmelts to be produced in free-flowing form, the processing of the adhesives present in that form is made much easier. The hotmelts, particularly pressure-sensitive hotmelts, finished with the release agents of the invention can be further processed in the usual way using machines designed for that purpose.

The invention will be illustrated but not limited by the following examples.

EXAMPLES

A pressure-sensitive hotmelt based on copolymers of ethylene and vinyl acetate (type A) and on styrene-butadiene-styrene block polymers (type B) and conventional adhesive resins (cf. D. L. Baterman: Hot Melt Adhesives, 3rd Edition (1978), pages 304/5 and 312/3) was prepared using a standard commercially available machine for the production of strip granulates manufactured by Gebr. Kaiser, 4150 Krefeld, Magdeburger Str. 17 (cf. "Seifen-Oele-Fette-Wachse" (1976), pages 279–282).

The following suspensions or solutions were used as aqueous release agents:

(1)
  5 kg of pentaerythritol (tetramethylolmethane)
  15 kg of trimethylolethane in
  80 kg of water (2) 5 kg of very finely powdered calcium stearate were dispersed in the aqueous solution according to (1) using a high speed stirrer.

(3)
  5 kg of pentaerythritol (tetramethylolmethane)
  15 kg of trimethylolpropane in
  80 kg of water.

(4) 5 kg of very finely powdered calcium stearate were suspended in the aqueous solution according to (3) using a high speed stirrer.

(5)
  5 kg of potassium citrate
  5 kg of potassium tartrate in
  80 kg of water.

(6) 5 kg of calcium behenate were suspended in the solution according to (5) using a high-speed stirrer.

(7)
  5 kg of potassium sodium tartrate
  25 kg of trimethylolethane in
  80 kg of water.

(8) 5 kg of very finely powdered aluminum palmitate were dispersed in the aqueous solution according to (7) using a high-speed stirrer.

(9)
  3 kg of ethylene glycol
  17 kg of trimethylolpropane in
  80 kg of water.

(10) 5 kg of very finely powdered calcium behenate were suspended in the aqueous solution according to (9) using a high-speed stirrer.

(11)
  7.5 kg of trimethylolpropane and
  7.5 kg of calcium stearate were suspended in
  88.0 kg of water

(12)
  2.5 kg of mannitol,
  5.0 kg of trimethylolpropane and
  5.0 kg of aluminium stearate were suspended in
  87.5 kg of water.

The above-described solutions or suspensions (1) to (10) were used for testing portions of the above-described strip granulate (approximate dimensions 12×15×15 mm) and were continuously pump-circulated in the process. A temperature of from 18° to 22° C. was maintained. After removal from the discharge unit of the granulating machine, the granulate was filtered under suction on a belt-type suction filter and dried for 15 minutes with air at 30° C.

The granulates were free-flowing. The surfaces contained only 3 to 5% of active component of the release agent. None of the granulates showed any deterioration in the release effect after storage for 3 months at 25° C.

So far as adhesiveness as determined by the 180° peel test (cf. Donatas Satas: "Handbook of Pressure-Sensitive Adhesive Technology" (1982) by van Nostrand Reinhold Company Inc., pages 51 to 53) is concerned, no differences were observed between the pressure-sensitive holtmelts packed in blocks (in silicone paper) measuring 15×15×15 cm and the pressure-sensitive hotmelts granulated in accordance with the invention. Average peel strength:
type A: 12–16 N/25 mm
type B: 32–38 N/25 mm.

These values remained virtually unchanged after the granulates had been stored for 2 months.

What is claimed is:

1. An aqueous release agent for the antiadhesive surface finishing of tacky hot-melt adhesive pellets, granulates, cubes, flakes and the like, consisting essentially of an about 0.5 to about 25% by weight aqueous solution of (a) at least one aliphatic alcohol having at least 2 hydroxy groups and containing from 3 to 7 carbon atoms or (b) at least one aliphatic hydroxy dicarboxylic or tricarboxylic acid or water-soluble salt thereof, or (c) a mixture of (a) and (b) and from about 0.2 to about 15% by weight, based on the weight of the aqueous solution, of a water-insoluble salt of a $C_{12}$–$C_{36}$ saturated aliphatic or alicyclic mono- or dicarboxylic acid.

2. An aqueous release agent in accordance with claim 1 wherein one or more of a trimethylolalkane containing from 2 to 4 carbon atoms in the alkane skeleton, tetramethylolmethane, mannitol, dihydroxy succinic acid, citric acid, and a water-soluble salt of any of the foregoing, is present in the aqueous release agent.

3. An aqueous release agent in accordance with claim 1 wherein from about 5 to about 20% by weight solution is present.

4. An aqueous release agent in accordance with claim 1 wherein from about 0.5 to about 10% by weight, based on the weight of the aqueous solution, of the calcium and/or aluminium salt of a $C_{14}$–$C_{22}$ saturated fatty acid is present as the water-insoluble salt of an aliphatic monocarboxylic acid.

* * * * *